United States Patent
Goebel et al.

(10) Patent No.: US 8,603,701 B2
(45) Date of Patent: Dec. 10, 2013

(54) SHEARED EDGE ON FUEL CELL COMPONENTS FOR WICKING OF WATER

(75) Inventors: Steven G. Goebel, Victor, NY (US); Jeffrey A. Rock, Fairport, NY (US); Jon P. Owejan, Honeoye, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 371 days.

(21) Appl. No.: 12/701,989

(22) Filed: Feb. 8, 2010

(65) Prior Publication Data

US 2011/0195335 A1    Aug. 11, 2011

(51) Int. Cl.
*H01M 8/04* (2006.01)
(52) U.S. Cl.
USPC .......................................... 429/514
(58) Field of Classification Search
None
See application file for complete search history.

(56) References Cited

U.S. PATENT DOCUMENTS

| | | |
|---|---|---|
| 6,936,369 B1 | 8/2005 | Komura et al. |
| 7,531,264 B2 * | 5/2009 | Bai et al. ................ 429/415 |
| 8,168,340 B2 * | 5/2012 | Whitehead et al. ......... 429/414 |
| 2008/0118809 A1 | 5/2008 | Tighe et al. |
| 2008/0171253 A1 | 7/2008 | Owejan et al. |
| 2008/0193827 A1 * | 8/2008 | Jang et al. .................. 429/41 |

FOREIGN PATENT DOCUMENTS

| | | | |
|---|---|---|---|
| CN | 101405903 A | | 4/2009 |
| CN | 101533916 A | * | 9/2009 |
| WO | WO2007008851 | * | 8/2007 |

* cited by examiner

*Primary Examiner* — Patrick Ryan
*Assistant Examiner* — Wyatt McConnell
(74) *Attorney, Agent, or Firm* — Fraser Clemens Martin & Miller LLC; J. Douglas Miller

(57) ABSTRACT

A fuel cell component including a body disposed along a plane and having a boundary past which a reactant and water flows is provided. The boundary has a discontinuous edge adapted to militate against a pinning of the water at the edge. The fuel cell component may be a bipolar plate having a port hole with the discontinuous edge. The fuel cell component may be a subgasket for a fuel cell having a boundary with the discontinuous edge. The discontinuous edge facilitates a transportation of water from an upper surface of the fuel cell component to a lower surface of the fuel cell component.

20 Claims, 5 Drawing Sheets

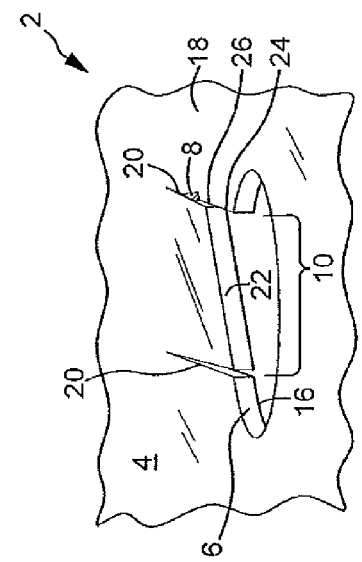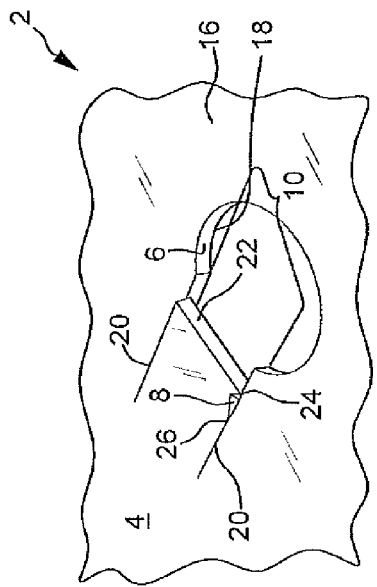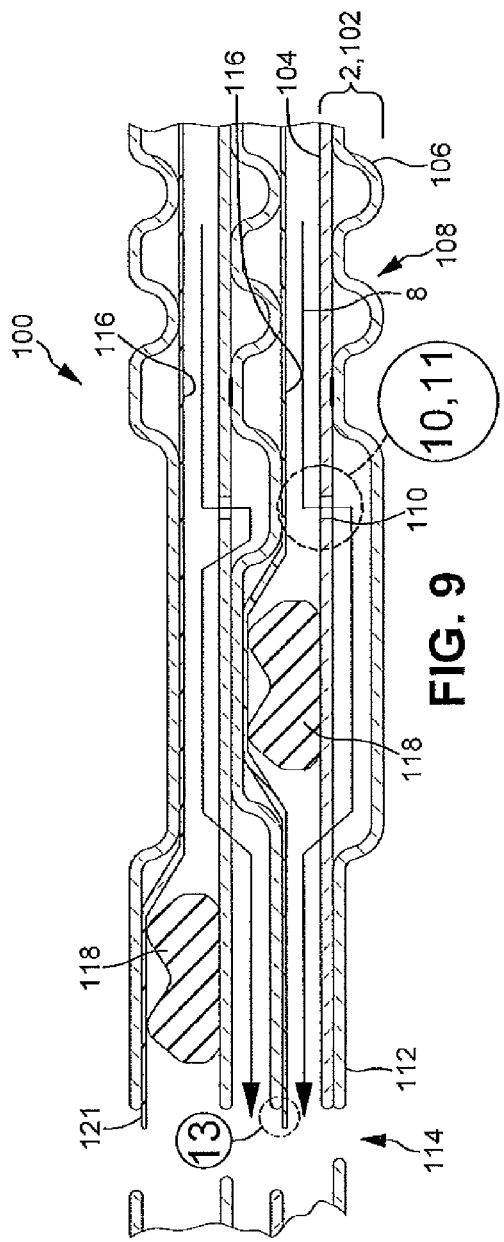

SHEARED EDGE ON FUEL CELL COMPONENTS FOR WICKING OF WATER

FIELD OF THE INVENTION

The invention relates to fuel cells, and more particularly to fuel cell components having features that facilitate water removal from fuel cells.

BACKGROUND OF THE INVENTION

Fuel cell power systems convert a fuel and an oxidant to electricity. One type of fuel cell power system employs a proton exchange membrane (hereinafter "PEM") to catalytically facilitate reaction of the fuel (such as hydrogen) and the oxidant (such as air or oxygen) to generate electricity. Water is a byproduct of the electrochemical reaction. Typically, fuel cell components such as plates include port holes that permit reactants and water to flow into tunnel regions, past seals, and into exhaust manifolds. Fuel cell components such as subgaskets also have boundaries past which reactants and water flow in route to the exhaust manifolds. However, where the port holes and the boundaries have squared (approximately 90°) edges, surface tension pins water droplets and inhibit a rapid removal of water. An accumulation of water within the fuel cell must be managed in order to optimize a performance of the fuel cell.

A number of strategies are known for removing water from the tunnel regions of the fuel cell. One strategy is described in Assignee's co-pending U.S. Pat. Appl. Pub. No. 2008/0171253 to Owejan et al., the entire disclosure of which is herein incorporated herein by reference. Owejan et al. describes a bipolar plate for a fuel cell having an exhaust opening with a chamfered peripheral edge in communication with an active surface of the fuel cell, and forming a water removal channel.

Another strategy is described in Assignee's co-pending U.S. Pat. Appl. Publ. No. 2008/0118809 to Tighe et al., the entire disclosure of which is hereby incorporated herein by reference. Tighe et al. describes a fuel cell stack having a porous material internally disposed in the fuel cell stack outlet manifolds to facilitate a transport of liquid water from fuel cell plate outlets.

A further strategy is described in Assignee's co-pending U.S. patent application Ser. No. 12/244,992 to Owejan et al., the entire disclosure of which is A further strategy is described in Assignee's co-pending U.S. patent application Ser. No. 12/244,992 to Owejan et al., the entire disclosure of which is hereby incorporated herein by reference. U.S. patent application Ser. No. 12/244,992 describes a conduit having a continuous seam formed between a first plate and a second plate of a bipolar plate to facilitate a transport of water to an outlet of a fuel cell having the bipolar plate.

As described in U.S. Pat. No. 6,936,369 to Komura et al., it is also known to use a porous, water-absorbing tube to discharge water to the outside of a fuel cell stack. The entire disclosure of Komura et al. is hereby incorporated herein by reference.

There is a continuing need for cost effective fuel cell components such as fuel cell plates, which facilitate a transport of water through the fuel cell. Desirably, the features of the fuel cell components facilitating the water transport are inexpensive, minimize the number of required components, and are simple to manufacture.

SUMMARY OF THE INVENTION

In concordance with the instant disclosure, a fuel cell component such as a fuel cell plate that facilitates a transport of water through the fuel cell, is inexpensive, minimizes the number of required components, and is simple to manufacture, is surprisingly discovered.

In a first embodiment, a fuel cell component includes a body disposed along a plane and having a boundary past which a reactant and water flows. The boundary has a discontinuous edge adapted to militate against a pinning of the water at the edge.

In another embodiment, the fuel cell component is a bipolar plate for a fuel cell. The bipolar plate includes a first unipolar plate and a second unipolar plate. At least one of the first unipolar plate and the second unipolar plate has an active surface with a flowfield formed therein. At least one of the first unipolar plate and the second unipolar plate having a port hole. The bipolar plate further includes an outlet header disposed at an end of the first unipolar late and the second unipolar plate. The outlet header includes an exhaust opening formed therethrough. The port hole is configured to direct a flow of reactant and water to the outlet header. The port hole has a discontinuous edge adapted to militate against a pinning of the water at the edge.

In a further embodiment, the fuel cell component is a subgasket for a fuel cell. The subgasket includes a polymeric layer having a boundary with a discontinuous edge. The polymeric layer is coupled to a proton exchange membrane and configured be disposed adjacent a bipolar plate. The boundary of the polymeric layer is disposed beyond an outlet header of the bipolar plate.

DRAWINGS

The above, as well as other advantages of the present disclosure, will become readily apparent to those skilled in the art from the following detailed description, particularly when considered in the light of the drawings described herein.

FIG. 7 is another fragmentary, top perspective view of the fuel cell component shown in FIGS. 3 and 6, and further depicting the tab with the twist;

FIG. 8 is a fragmentary, bottom perspective view of the fuel cell component shown in FIGS. 6 to 7, and further depicting the tab with the twist;

FIG. 9 is a fragmentary, cross-sectional side elevational view of a fuel cell stack according to an embodiment of the present disclosure;

DETAILED DESCRIPTION OF THE INVENTION

Figure 1:
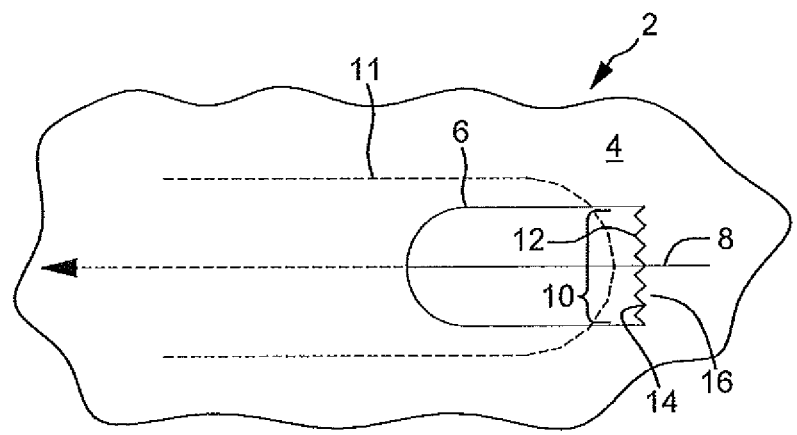
FIG. 1 is a schematic fragmentary, top plan view of a fuel cell component with a discontinuous edge according to one embodiment of the present disclosure.

The following detailed description and appended drawings describe and illustrate various embodiments of the invention. The description and drawings serve to enable one skilled in the art to make and use the invention, and are not intended to limit the scope of the invention in any manner.

As shown in FIGS. 1-8, the present disclosure includes a fuel cell component 2 that facilitates the transportation of water through a fuel cell stack (not shown). Exemplary fuel cell stacks that may be employed with the fuel cell components 2 of the present disclosure are described in Assignee's co-pending U.S. Pat. Appl. Pub. No. 2008/0171253, U.S. Pat. Appl. Publ. No. 2008/0118809, and U.S. application Ser. No. 12/244,992, the entire disclosures of which are hereby incorporated herein by reference. A skilled artisan should understand that the fuel cell component 2 of the present disclosure may be used with any other fuel cell stack design requiring water management, as desired.

The fuel cell component 2 includes a body 4 disposed along a plane and having a boundary 6 past which a flow of reactant and water 8 travels. The body 4 may be stamped, machined, or molded, as illustrative examples. The present invention is applicable to any boundary 6 where droplets of the water 8 from the fuel cell stack might otherwise accumulate and be pinned. As nonlimiting examples, the boundary 6 may be in the form of a port hole, a reactant inlet, an exhaust outlet, or a terminal end of the fuel cell component. The boundary 6 of the fuel cell component 2 has a discontinuous edge 10 adapted to militate against a pinning of the water 8 at the boundary 6. The relatively small geometry of the discontinuous edge 10, comparative to water droplet size, is configured to reduce water droplet deformation before the water 8 contacts a vertical structure, thereby reducing the pinning of the water 8 at the boundary 6.

Figure 2:
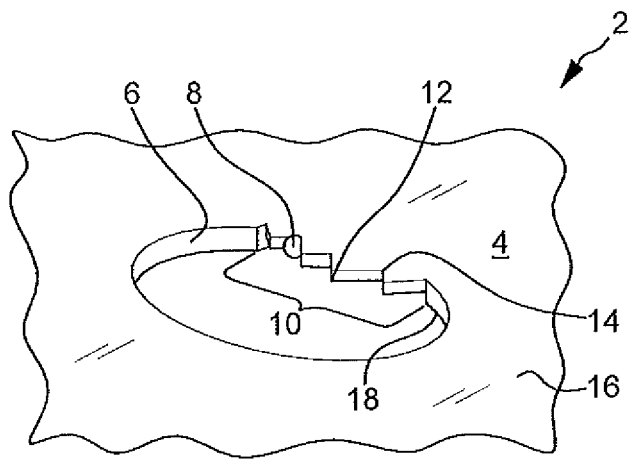
FIG. 2 is a fragmentary, top perspective view of the fuel cell component shown in FIG. 1.
Figure 3:
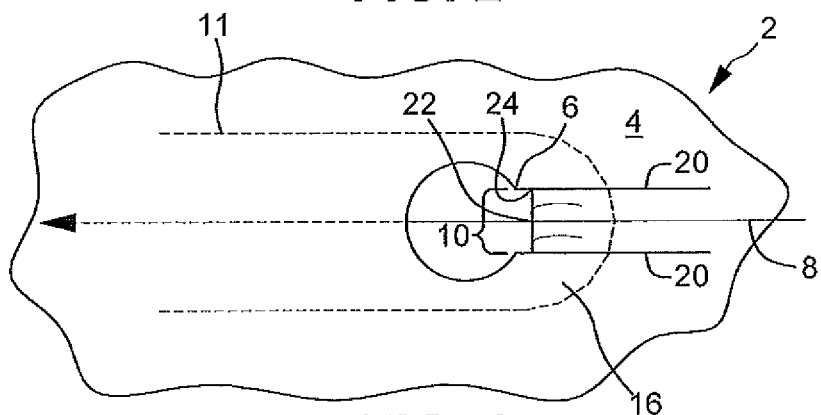
FIG. 3 is a schematic fragmentary, top plan view of a fuel cell component with a discontinuous edge according to another embodiment of the present disclosure.

As shown in FIGS. 1 and 2, the fuel cell component 2 may have a discontinuous edge 10 with a plurality of peaks 12 and valleys 14. The valleys 14 may be substantially V-shaped, for example, and provide a serrated discontinuous edge 10. The valleys 14 extend from an upper surface 16 of the body 4 to a lower surface 18 of the body 4. The discontinuous edge 10 facilitates a transport of the water 8 from the upper surface 16 to the lower surface 18. Droplets of the water 8 forming at the boundary 6 adjacent the valleys 14 of the discontinuous edge 10 are pulled over the points of the valleys 14 by surface tension and allow the water 8 to pass what would otherwise be a pinning edge at the boundary 6. A crevice 11, formed by a junction between the lower surface 18 of the body 4 and an upper surface of another body, provides a continuous path for drainage of the water 8 from the upper surface 16 of the body 4 and away from the fuel cell component 2.

Referring now to FIGS. 3 to 8, the discontinuous edge 10 of the fuel cell component 2 may include at least one shear cut 20. The shear cut 20 extends through the body 4 from the upper surface 16 to the lower surface 18. The shear cut 20 may be formed in the body 4 adjacent the boundary 6. For example, the shear cut 20 may begin at the boundary 6 and extend inwardly into the body 4 from the boundary 6. The shear cut 20 creates a very small angle and small gap crevice for which the water 8 has a high affinity due to surface tension of the water 8. Like with the valleys 14 described above, droplets of the water 8 that form adjacent the shear cut 20 are pulled or wicked into the shear cut 20. The shear cut 20 thereby facilitates a transportation of the water 8 from the upper surface 16 of the body 4 to the lower surface 18 of the body 4.

In particular embodiments, the discontinuous edge 10 includes a pair of the shear cuts 20. Each of the pair of shear cuts 20 is spaced apart from the other, and together forms a tab 22 in the body 4 therebetween. The tab 22 provides two small gap crevices for which the water 8 has a high affinity. The tab 22 may also be cut back, and an intervening material removed, to form a corner 24 extending form the upper surface 16 to the lower surface 18 of the body 4. The shear cut 20 and the corner 24 may cooperate to form a continuous path for the water 8 to travel along from the upper surface 16 to the lower surface 18 of the body 4. It should be appreciated that the tab 22 may include further discontinuities such as the peaks 12 and the valleys 14 described hereinabove, for example. Where the body 4 is formed from a fiber-containing composite material, the discontinuities may be in the form of fibers extending from the cut edge of the boundary 6. The discontinuities may further facilitate the transportation of the water 8.

Figure 4:
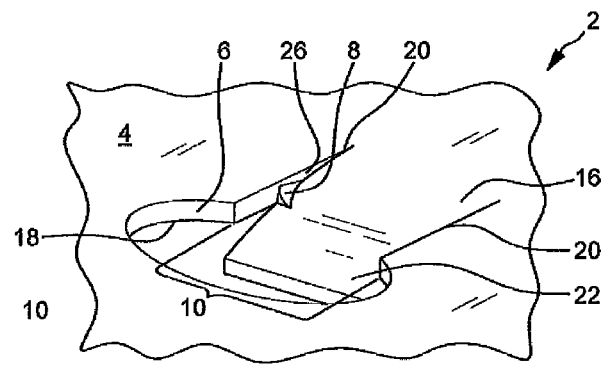
FIG. 4 is a fragmentary, top perspective view of the fuel cell component shown in FIG. 3, and further depicting a tab with a bend.
Figure 5:
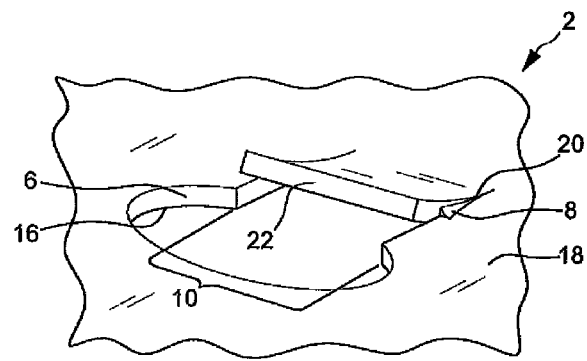
FIG. 5 is a fragmentary, bottom perspective view of the fuel cell component shown in FIGS. 3 and 4, and further depicting the tab with the bend.
Figure 6:
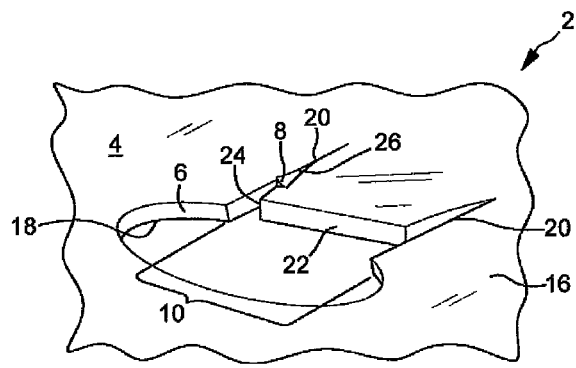
FIG. 6 is a fragmentary, top perspective view of the fuel cell component shown in FIG. 3, and further depicting a tab with a twist.

In certain embodiments, the tab 22 may be at least one of bent out of the plane of the body 4, for example, as shown in FIGS. 4 and 5, and twisted out of the plane of the body 4, for example, as shown in FIGS. 6 to 8. The bending and twisting of the tab 22 exposes additional surface area to enhanced wicking into the shear cuts 20. An extent of at least one of the bending and the twisting of the tab 22 is within a thickness of the body 4. Where the tab 22 is at least one of bent and twisted within the thickness of the body 4, at least one of the bend and the twist provides an additional corner 26 along which the water 8 may travel from the upper surface 16 to the lower surface 18 of the body 4. The discontinuous edge 10 may thereby provide a continuous water flow path from the upper surface 16 to the lower surface 18 of the body 4. Additionally, the crevice 11 formed at the junction between the body 4 and another body may cooperate with the discontinuous edge 10 and form part of the continuous water flow path.

Figure 10:
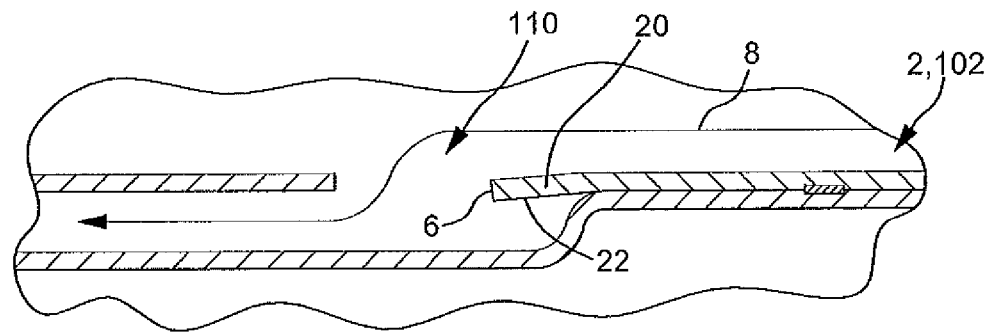
FIG. 10 is an enlarged fragmentary, cross-sectional side elevational view of the fuel cell stack shown in FIG. 9, further depicting a bipolar plate with a port hole having a tab with a bend.
Figure 11:
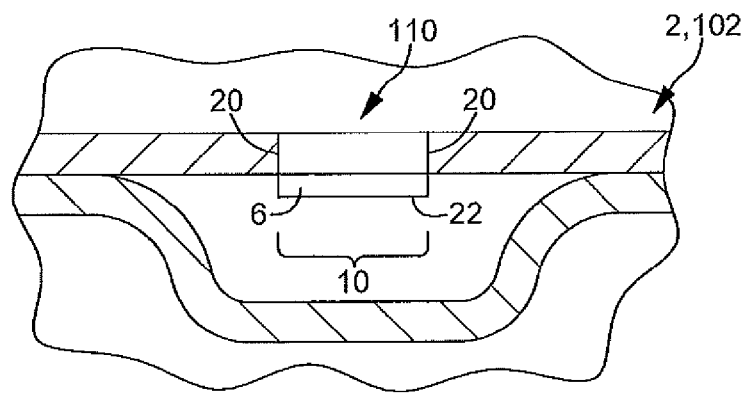
FIG. 11 is an enlarged fragmentary, cross-sectional end view of the port hole shown in FIG. 10.

With reference to FIGS. 9-11, the present disclosure includes a fuel cell 100 in a fuel cell stack having one or more fuel cell components 2 as described hereinabove. For example, the fuel cell component 2 may be a bipolar plate 102. The bipolar plate 102 includes a first unipolar plate 104 and a second unipolar plate 106. At least one of the first unipolar plate 104 and the second unipolar plate 106 have an active surface 108 with a flowfield formed therein. At least one of the first unipolar plate 104 and the second unipolar plate 106 also have a port hole 110 formed therein. With respect to the flow of the reactant and water 8 shown, it should be appreciated that the flow may not be entirely in the section depicted, for example, the flow may instead follow the channels formed in the bipolar plate 2 either in front of or behind the section.

The bipolar plate 102 includes an outlet header 112 disposed at an end of the first unipolar late 104 and the second unipolar plate 106. The outlet header 112 has an exhaust opening 114 formed therethrough. Where the fuel cell 100 is disposed in a stack having a multitude of like fuel cells 100, the respective outlet headers 112 and the exhaust openings 114 may form an exhaust manifold of the fuel cell stack, for example. The bipolar plate 102 is stacked with like bipolar plates 102 in the fuel cell stack. A proton exchange membrane 116 is disposed between the respective bipolar plates 102 and extends from the active surfaces 108 of the bipolar plates 102 past a seal 118, and to the exhaust opening 114. A subgasket 121, formed from a substantially fluid impermeable, polymeric layer, may be coupled to the proton exchange membrane 116 between the respective bipolar plates 102. The subgasket 121 extends into the exhaust opening 114 formed by the outlet header 112.

The port hole 110 is configured to direct the flow of the reactant and the water 8 to the outlet header 112, to be exhausted from the fuel cell 100 via the exhaust opening 114. In particular, due to the placement of the seal 118 between the bipolar plates 102, the port hole 110 directs the flow of reactant and the water 8 underneath the seal 118 to the exhaust opening 114. The port hole 110 has the discontinuous edge 10 adapted to militate against the pinning of the water 8 at the boundary 6 formed by the port hole 110. The junction between the first unipolar plate 104 and the second unipolar plate 106 may further provide the crevice 11 that cooperates with the discontinuous edge 10 and forms part of the continuous water flow path away from the bipolar plate 102. Where a tunnel is formed between the first and second unipolar plates 104, 106, the water 8 flows therethrough to the exhaust opening 114.

As a nonlimiting example, the port hole 110 may have the pair of shear cuts 20 forming the tab 22 adjacent the port hole 110. Where the first and second unipolar plates 104, 106 are formed from stamped metal, welded together, the shear cuts 20 are terminated before the weld between the first and second unipolar plates 104, 106 to avoid leaks. As shown in FIGS. 10 and 11, the tab 22 may be bent downwardly to provide the discontinuous edge 10 at the boundary 6, and facilitate the transportation of the water 8 from the active surface 108 of the bipolar plate 102.

Figure 12:
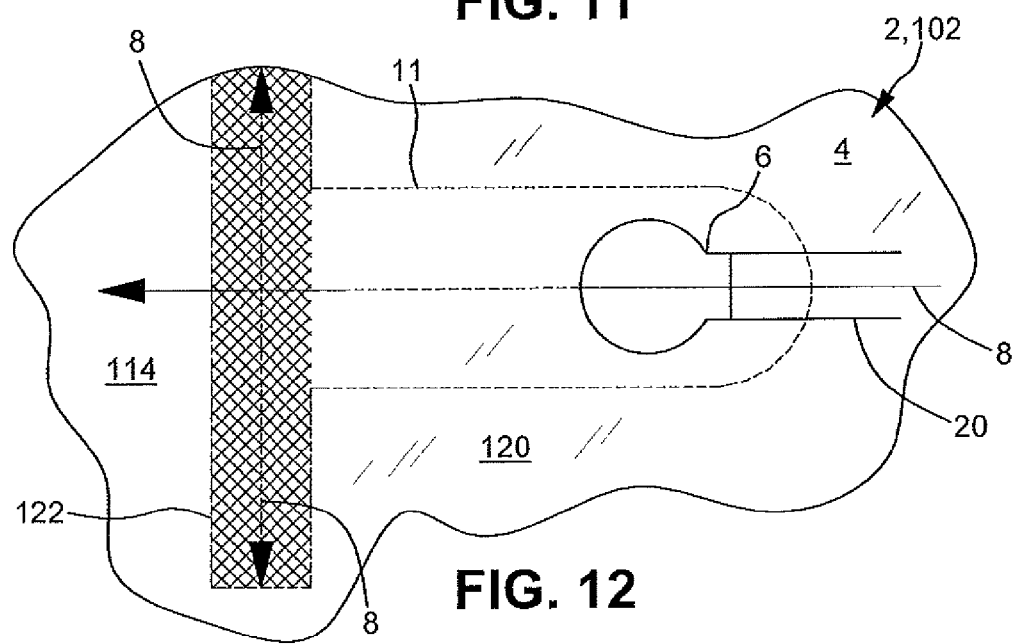
FIG. 12 is a schematic, top plan view of a fuel cell component with a discontinuous edge as shown in FIG. 3, depicting further water management features such as a hydrophilic coating and a header wick.

It should be understood that other water management strategies may be employed with the fuel cell component 2 of the instant disclosure. For example, in further embodiments illustrated in FIG. 12, the bipolar plate 102 has a hydrophilic treatment or coating 120 disposed adjacent the boundary 6. The hydrophilic coating 120 is preferably applied after the shear cuts 20 are formed to allow the hydrophilic coating 120 to cover the small crevices formed by the shear cuts 20. To maximize the wicking capability, the hydrophilic coating 120 may also cover the tunnel region from the port hole 110 to the exhaust opening 114 of the fuel cell 100. In a further example, the bipolar plate 102 may have a wicking element 122 disposed over a length of the outlet header 112, and adjacent the exhaust opening 114. The wicking element 122 may be disposed along the entire periphery of the exhaust opening 114, for example. The wicking element 122 is in communication with the exhaust opening 114 and facilitates the wicking of the water 8 from bipolar plate 102. Other water management strategies may also be employed, as desired.

The bipolar plate 102 having the discontinuous edge 10 has been described hereinabove with respect to the port hole 110 adjacent the outlet header 112. However, it should be understood that the port holes 110 adjacent an inlet header of the bipolar plate 102 may also each be provided with the discontinuous edge 10. The bipolar plate 102 having the discontinuous edge 10 on both inlet and outlet port holes 110 facilitates a reversibility of the bipolar plate 102 within the fuel cell.

Figure 13:
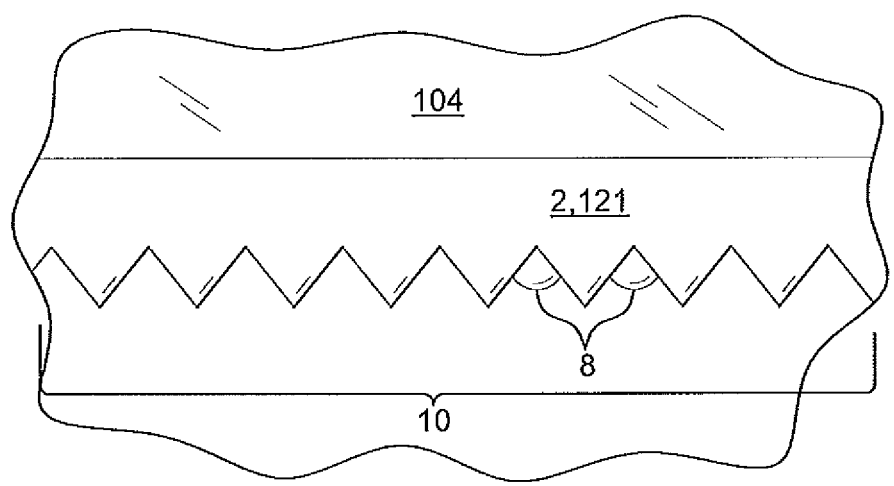
FIG. 13 is an enlarged fragmentary, top plan view of the fuel cell stack shown in FIG. 9, further depicting a subgasket having a discontinuous edge.

Although the fuel cell component 2 has been described hereinabove with respect the bipolar plate 102 embodiment, it should be understood that other fuel cell components 2 may also have the discontinuous edges 10 to facilitate the transportation of the water 8 in the fuel cell 100. For example, as shown in FIG. 13, the subgasket 121 of the fuel cell 100 may also have the boundary 6 with the discontinuous edge 10. In one particular embodiment, the boundary 6 of the subgasket 121 disposed in the exhaust opening 114 may be serrated. An edge of at least one of the first and second unipolar plates 104, 106 may also be discontinuous, for example, with shear cuts, as desired.

A design suitable for stamped plate fuel cells which facilitates the wicking of water past the port holes by use of a shear cut at the edge of the port holes has been discovered. This shear cut creates a very small angle and small gap crevice which has a high affinity for liquid water. Water around the edge of the shear cut will be pulled over the point of the shear cut thus allowing water to pass what would otherwise be a pinning edge.

Advantageously, the fuel cell component 2 of the present disclosure provides a cost effective and durable means for wicking the water 8 from the fuel cell stack, and allowing the water 8 to be discharged from the fuel cell stack for stable and freeze capable fuel cell operation.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell component, comprising:
a body disposed along a plane and having a boundary past which a reactant and water flows, the boundary separating an upper surface of the body from a lower surface of the body and defining an aperture on the body, wherein the body includes a pair of shear cuts that do not intersect each other formed in the body adjacent the boundary, the shear cuts forming a discontinuous edge in the boundary to militate against a pinning of the water at the boundary, the shear cuts further forming a tab in the body therebetween, the tab having a shape different from a shape of the aperture.

2. The fuel cell component of claim 1, wherein at least one crevice is formed between one of the shear cuts and the tab.

3. The fuel cell component of claim 2, wherein the tab is bent out of the plane of the body.

4. The fuel cell component of claim 2, wherein the tab is twisted out of the plane of the body such that a first side edge of the tab formed by a first shear cut is elevated relative to the plane of the body while a second side edge of the tab formed by a second shear cut is recessed relative to the plane of the body.

5. The fuel cell component of claim 1, wherein the discontinuous edge forms a continuous water flow path from an upper surface of the body to a lower surface of the body.

6. A bipolar plate for a fuel cell, comprising:
a first unipolar plate and a second unipolar plate, at least one of the first unipolar plate and the second unipolar plate having an active surface with a flowfield formed therein, at least one of the first unipolar plate and the second unipolar plate having a port hole formed therein; and
an outlet header disposed at an end of the first unipolar plate and the second unipolar plate and including an exhaust opening formed therethrough,
wherein the port hole is configured to direct a flow of reactant and water to the outlet header, the port hole having a discontinuous edge to militate against a pinning of the water at the port hole, the discontinuous edge formed by a pair of shear cuts that do not intersect each other formed in the at least one of the first unipolar plate and the second unipolar plate adjacent the port hole, the shear cuts forming a tab in the at least one of the first unipolar plate and the second unipolar plate therebetween, the tab having a shape different from a shape of the port hole.

7. The bipolar plate of claim 6, wherein the tab is cut back from a remainder of the port hole.

8. The bipolar plate of claim 6, wherein the tab is twisted out of the plane of the at least one of the first unipolar plate and the second unipolar plate such that a first side edge of the tab formed by a first shear cut is elevated relative to the plane of the at least one of the first unipolar plate and the second unipolar plate while a second side edge of the tab formed by a second shear cut is recessed relative to the plane of the at least one of the first unipolar plate and the second unipolar plate.

9. The bipolar plate of claim 6, wherein the discontinuous edge crosses over a crevice between the first and second unipolar plates to allow the water to wick from a lower surface of the first unipolar plate to a top surface of the second unipolar plate, the first and second unipolar plates forming a tunnel therebetween to direct the flow of the reactant and the water to the outlet header.

10. The bipolar plate of claim 6, wherein the at least one of the first unipolar plate and the second unipolar plate has a hydrophilic coating disposed adjacent the boundary.

11. The bipolar plate of claim 6, further including a wicking element disposed at a periphery of the exhaust opening in the outlet header, the wicking element facilitating a wicking of the water from bipolar plate.

12. The fuel cell component of claim 1, wherein the boundary is wider than the tab.

13. The fuel cell component of claim 1, wherein the boundary is in the form of a port hole.

14. The fuel cell component of claim 1, wherein the boundary is in the form of a reactant inlet or an exhaust outlet.

15. The fuel cell component of claim 1, wherein the boundary is in the form of a terminal end of the fuel cell component.

16. The fuel cell component of claim 1, wherein the tab is cut back from a remainder of the boundary to form a corner extending from an upper surface of the body to a lower surface of the body.

17. The fuel cell component of claim 1, wherein the tab includes peaks and valleys.

18. The fuel cell component of claim 1, wherein the body comprises a fiber-containing composite material and the tab includes fibers extending from the cut edge of the boundary.

19. The bipolar plate of claim 6, wherein at least one crevice is formed between one of the shear cuts and the tab.

20. A fuel cell component comprising:
a first body disposed along a plane and having an aperture defined by a boundary, the aperture configured for a reactant and water to flow therethrough, wherein the first body includes a pair of shear cuts that do not intersect each other formed in the first body adjacent the boundary, the shear cuts forming a serrated discontinuous edge, the serrated discontinuous edge forming a portion of the boundary and militating against a pinning of the water at the boundary, the shear cuts further forming a tab in the body therebetween, the tab having a shape different from a shape of the aperture;
a second body; and
a crevice formed by a junction between a lower planar surface of the first body and an upper surface of the second body, the crevice providing a continuous path for drainage of water from an upper surface of the first body and away from the fuel cell component.

* * * * *